United States Patent
Yi et al.

(10) Patent No.: US 12,024,436 B2
(45) Date of Patent: Jul. 2, 2024

(54) METHOD TO CONTROL THE ETCHING RATE OF MATERIALS

(71) Applicant: BATTELLE MEMORIAL INSTITUTE, Richland, WA (US)

(72) Inventors: Ran Yi, Richland, WA (US); Ji-Guang Zhang, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 537 days.

(21) Appl. No.: 17/241,743

(22) Filed: Apr. 27, 2021

(65) Prior Publication Data
US 2022/0340429 A1    Oct. 27, 2022

(51) Int. Cl.
*C01B 33/023* (2006.01)
*C03C 15/00* (2006.01)
*C09K 13/08* (2006.01)

(52) U.S. Cl.
CPC ............ *C01B 33/023* (2013.01); *C03C 15/00* (2013.01); *C09K 13/08* (2013.01); *C01P 2004/61* (2013.01)

(58) Field of Classification Search
CPC ........ C01B 33/023; C03C 15/00; C09K 13/08
See application file for complete search history.

(56) References Cited

U.S. PATENT DOCUMENTS

| 10,910,412 | B2 | 2/2021 | Kim et al. | |
|---|---|---|---|---|
| 2012/0094501 | A1* | 4/2012 | Maehliss | C09K 13/10 252/79.3 |
| 2016/0102250 | A1* | 4/2016 | Collard | C01B 21/46 252/79.3 |
| 2018/0198116 | A1* | 7/2018 | Aurora | C01B 33/037 |

FOREIGN PATENT DOCUMENTS

WO    WO-2006054996 A1 *  5/2006    ............. C09K 13/08

OTHER PUBLICATIONS

Steinert, M., et al. "Study on the mechanism of silicon etching in HNO3-rich HF/HNO3 mixtures." The Journal of Physical Chemistry C 111.5 (2007): 2133-2140.*
Lion, Anna, et al. "Angle resolved XPS for selective characterization of internal and external surface of porous silicon." Applied Surface Science 406 (2017): 144-149.*
Baumer, A., Structural and Electronic Properties of Hydrosilylated Silicon Surfaces, Walter Schottky Institut, Zentralinstitut fur physikalich Grundlagen der Halbleiterelektronik Fakultat fur Physic der Technischen Universitat Munchen, Nov. 2005.

* cited by examiner

*Primary Examiner* — Richard M Rump
(74) *Attorney, Agent, or Firm* — Derek H. Maughan

(57) ABSTRACT

A method for etching materials in which organic solvents are added to the etching mixture and combined in a mixing arrangement. When agitated organic materials mix with the etching agent and interact with the underlying material to form a shield around the etched areas that prevents the additional interaction of water with the newly etched areas and enables the etching of silicon oxides (SiOx) but does not oxidize Si. This method leads to milder reactions with less heat generation and avoids the safety hazards associated with conventional etching methods.

17 Claims, 3 Drawing Sheets

METHOD TO CONTROL THE ETCHING RATE OF MATERIALS

STATEMENT AS TO RIGHTS TO DISCLOSURES MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

BACKGROUND OF THE DISCLOSURE

Porous silicon (PSi or pSi) has been widely used in a number of disparate fields due to its unique physical and chemical properties. For example, PSi has been used as delivery vehicle due to its high surface area and biodegradable nature. Other applications include catalysis and imaging technologies. PSi has also been considered a precursor for Si-based anode materials for next generation lithium-ion batteries (LIBs).

A popular synthesis route to PSi is via removal of SiOx in an Si/SiOx matrix by etching. The porous structure (pore size, pore volume and pore size distribution) of resultant PSi are controlled by ratio and size of Si and SiOx components in the matrix. Conventional SiOx etchants for PSi production consist of aqueous solution of various etching agents such as hydrofluoric acid (HF), ammonium fluoride ($NH_4F$), Nitric acid ($HNO_3$) etc. In these acid etching agents, etching rate of SiOx is much higher than those of Si itself when water is not present. However, water is normally used in acid etching agent. In this case, after SiOx is readily removed by the conventional etchants, Si can also be over-etched because the water in the solution acts as an oxidizing agent which can react with newly exposed Si to generate more SiOx which can be further etched by the etchants. This is especially true for PSi with nano-sized pores and particles such as powders because large surface area (more than 500 $m^2/g$) significantly enhances the reaction rates. This then leads to the generation of excess heat, safety hazards, lower yields due to over-etching of Si, and uncontrollable PSi structure due to over-etching. In addition, conventional etching approaches used in the production of PSi are unsafe and difficult to scale up.

To address these issues, we disclose a new etching/etchant method and system consisting of organic solvents that are not miscible with water and cannot oxidize Si, etchants that can be mixed with both organic solvents and water. When the selected organic solvent (or mixture of organic solvents) is added to the solution of etchant/water solution, it will from a dual phase solution where the organic solvent forms a second layer suspension (or droplet suspension during stirring) within etchant/water solution. Because the organic solvent is also mixable with the etchant, part of etchant in the original etchant/water solution will be absorbed/mixed within the droplet suspension of organic solvent to form etchant/organic solvent solution. For the selected organic solvents with dissolved etchant, they have a much better wettability to the SiOx precursor (which contains Si and $SiO_2$, SiO etc) then water with dissolvent etchant. Therefore, when the Si containing material is added to the suspension of etchant/organic droplet in etchant/water solution, an etchant/organic droplet will be preferentially absorbed on the surface of the Si containing material. The resulting etchant within the etchant/organic droplet will be consumed to etch SiOx. More importantly, newly exposed Si surface (which is hydrophilic and easy to be oxidized by water) after etching of SiOx will not be exposed to water and hence the likelihood of over oxidation of Si is largely reduced.

The etchant within etchant/water solution can also serve as an etchant reservoir. After etchant in the etchant/organic droplet is depleted, etchant in etchant/water solution will continue to be dissolved in etchant/organic droplet. This process will continue until all of SiOx has been etched. Even at the end of the etching process, Si surfaces will be protected by organic solvents. During this process, etching is limited to original SiOx in the Si/SiOx matrix precursors. As a result, a mild etching reaction rate can be achieved without over-etching of Si, leading to a higher Si yield and a process with lower heat generation rate that is easy to handle. After etching completes and stirring stops, resulting PSi (i.e., etched SiOx precursor) and organic solvent will form a separate suspension layer on the top of depleted etchant/water solution which can be easily filtered and reused/recycled.

Additional advantages and novel features of the present disclosure will be set forth as follows and will be readily apparent from the descriptions and demonstrations set forth herein. Accordingly, the following descriptions of the present disclosure should be seen as illustrative of the disclosure and not as limiting in any way.

SUMMARY

The present disclosure describes a method for etching materials, which includes several steps whereby organic solvents are added to the etching mixture and combined in a mixing arrangement. When mixed together, the organic materials mix with the etching agent and interact with the underlying SiOx base to form a shield around the etched areas that prevents the additional interaction of water with the newly etched areas and enables the etching of silicon oxides (SiOx) but does not oxidize Si. This enables SiOx to be removed while keeping Si largely intact. When the solution is no longer mixed the phases of the liquid separate and the organic materials and the etching components can be captured and reused. Compared to conventional aqueous based etchants, this method leads to milder reactions with less heat generation and avoids the safety hazards associated with bubbling/spilling occurred in the conventional etching methods. It also increases the etching yield of porous Si (PSi) by preventing over-etching of Si. In addition, the etching agent used in this etchant system is easy to be separated and recycled/reused so the total cost of etching process is largely reduced. This method is particularly effective using powdered Si materials where the greater amount of surface area and reaction sites makes the prior art etching processes prone to overreaction and overheating.

In one embodiment the method includes forming a mixture that contains, a material having a surface that is to be etched and a core portion that is not to be etched and an etchant solution made up of an etchant, water and an organic solvent that can dissolve the etchant but is not miscible with water. Once this mixture is formed, alternatively stirring the mixture to etch the material and stopping the stirring to stop the etching. Etching takes place when the organic solvent with the etchant dissolved therein mixes with the water and contacts and etches the surface while the newly etched area is predominantly covered by the organic solvent which prevents additional interaction with water and hence over etching. In addition, when the mixing stops the individual component materials separate into layers which can be captured and in some instances recycled for later use. Preferably the stirring takes place for less than 3 hours.

In some instances, the material is a silicon oxide powder having granules of various sizes ranging from (10 nm-1 mm. Particular efficacy has been demonstrated on granules as small as 100 μm. In some cases, a pretreatment step such as heating in an inert atmosphere may be added to impart desired characteristics to the material.

Examples of organic solvents that could be used in such a method include but are not limited to aromatic compounds, aliphatic compounds and other similarly configured materials with specific examples including benzene, toluene, xylene, cumene, and mixtures thereof and hexane, cyclohexane, pentane, decene, and mixtures thereof. Sample etching agents include but are not limited to hydrofluoric acid (HF), ammonium fluoride ($NH_4F$), nitric acid ($HNO_3$) similar acidic materials and combinations thereof. In some embodiments the mixture contains a ratio of 1 part in weight of Si-containing powder, 5-40 parts in weight of organic solvent, and 5-20 parts in weight of acidic aqueous etchant. The specific ratio can be adjusted to balance the etching rate and avoid overheating.

The described process can be alternatively modified and reconfigured by alternatively stirring and not stirring a mixture that contains an organic solvent, an acidic aqueous etchant and a Si-containing powder. In such an arrangement etching of the Si-containing powder can be selected to occur predominantly when the mixture is stirred causing the Si powder and the aqueous acid etchant to be brought into contact while the organic solvent intervenes to form an organic phase that protects exposed Si from further reaction with the acidic aqueous etchant. This prevents additional etching and heat generation. When the stirring of the mixture stops, the Si containing powder separates into the organic phase away from the acidic aqueous etchant and the etching stops resulting in a material having a porous silicon structure. Preferably the resulting porous silicon material has a porosity of 10-90%. Preconditioning the starting materials through actions such as heating in an inert atmosphere may help to improve the results of this method.

In such a configuration the organic solvent comprises an aromatic compound, it may also or alternatively include an aliphatic compound. Examples of particular aromatic and aliphatic compounds include but are not limited to benzene, toluene, xylene, cumene, and mixtures thereof and hexane, cyclohexane, pentane, decene, and mixtures thereof. The etching agent may be selected from the group consisting of hydrofluoric acid (HF), ammonium fluoride ($NH_4F$), Nitric acid ($HNO_3$) and combinations thereof. While these exemplary materials are recited this recitation is intended to be exemplary only and not limiting.

A mixture of 1-part Si-containing powder, 5-20 parts organic solvent, and 5-40 parts acidic aqueous etchant (ratios by weight) has shown to be the most effective for forming desired structures such as PSi.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

Various advantages and novel features of the present disclosure are described herein and will become further readily apparent to those skilled in this art from the following detailed description. In the preceding and following descriptions I have shown and described only the preferred embodiment of the disclosure, by way of illustration of the best mode contemplated for carrying out the disclosure. As will be realized, the disclosure is capable of modification in various respects without departing from the disclosure. Accordingly, the drawings and description of the preferred embodiment set forth hereafter are to be regarded as illustrative in nature, and not as restrictive.

DETAILED DESCRIPTION OF THE DISCLOSURE

The following description includes a preferred best mode of one embodiment of the present disclosure. It will be clear from this description of the disclosure that the disclosure is not limited to these illustrated embodiments but that the disclosure also includes a variety of modifications and embodiments thereto. Therefore, the present description should be seen as illustrative and not limiting. While the disclosure is susceptible of various modifications and alternative constructions, it should be understood, that there is no intention to limit the disclosure to the specific form disclosed, but, on the contrary, the disclosure is to cover all modifications, alternative constructions, and equivalents falling within the spirit and scope of the disclosure as defined in the claims.

Figure 1:
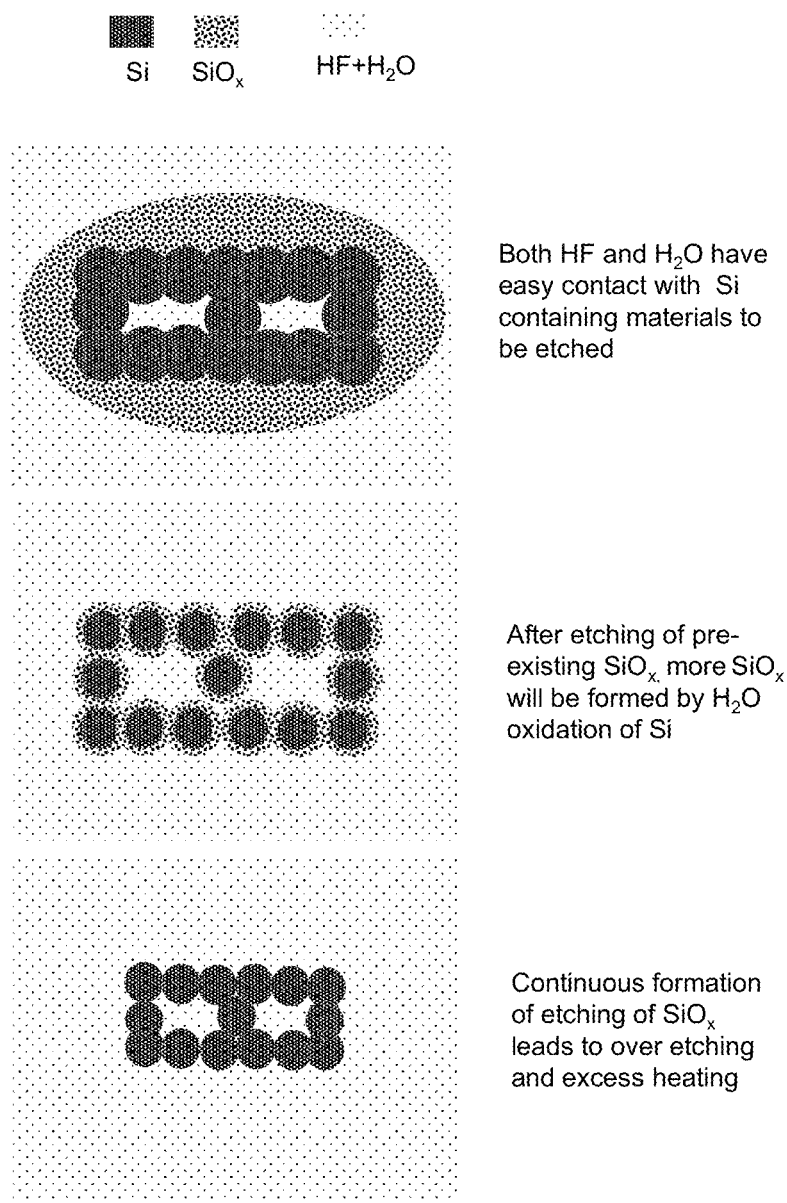
FIG. 1 shows a schematic of prior art method for etching.

As described previously, the prior art etching processes such as the one shown in FIG. 1 have a number of problems. Typically, an etching medium (in this case an acid HF and water) reacts with a silicon-containing material to etch however, the water also reacts with newly exposed silicon to form $SiO_2$ thus causing over etching and generating excess heat. This in turn leads to a number of other problems and has been very difficult to control.

Figure 2:
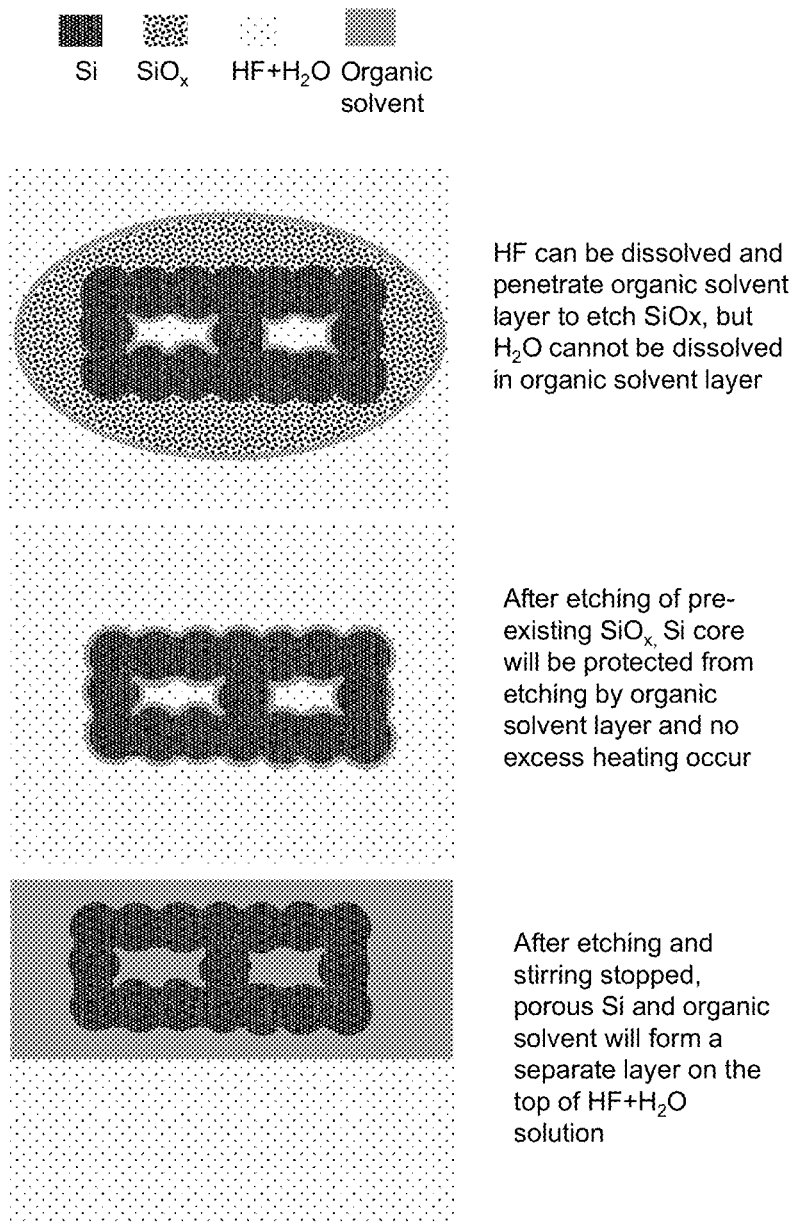
FIG. 2 shows a schematic of a new method for etching.
Figure 3:
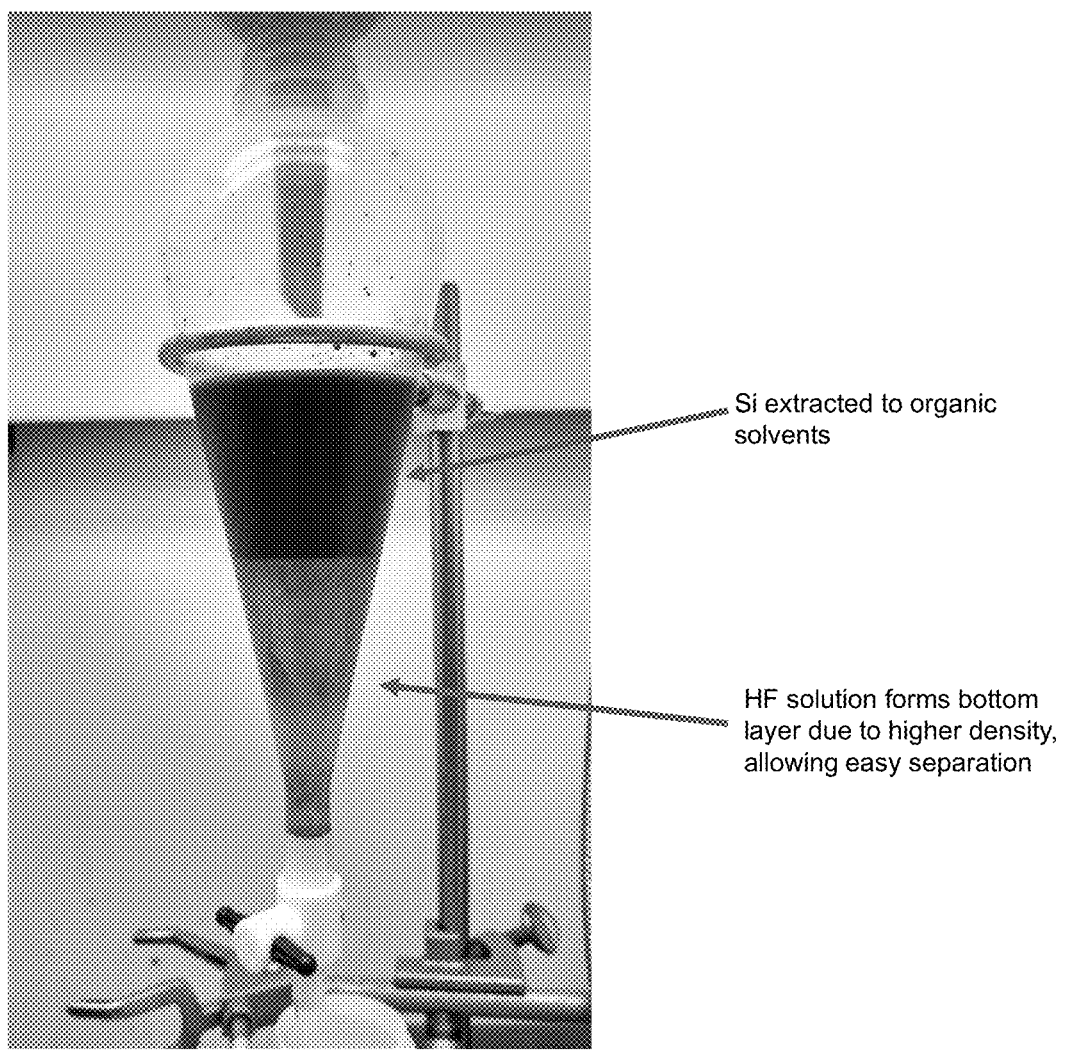
FIG. 3 shows an example demonstrating the separation of etched PSi/organic solvent suspend on the top of etchant/water solution after stirring stopped and ready for separation.

FIG. 2 shows schematic of a new methodology whereby organic solvents are added to the etching mixture and combined in a mixing arrangement. When mixed together the organic materials mix with the etching agent and interact with the underlying Si-containing powder to form a shield around the etched areas that prevents the additional interaction of water with the newly etched areas and enables the etching of silicon oxides (SiOx) but does not oxidize Si. This enables SiOx to be removed while keeping Si largely intact. As shown in FIG. 3, after etching finished and stirring stopped, etched Si/organic solvent will form a separate layer suspend on the top of etchant/water solution and the etching components can be captured and reused. Compared to conventional aqueous based etchants, this method leads to milder reactions with less heat generation and avoids the safety hazards associated with bubbling/spilling occurred in the conventional etching methods. It also increases the etching yield of porous Si (Psi) by preventing over-etching of Si. In addition, the etching agent used in this etchant system is easy to be separated and recycled/reused so the total cost of etching process is largely reduced. This method is particularly effective using powdered Si-containing material where the greater amount of surface area and reaction sites makes the prior art etching processes prone to over reaction and heating.

Compared to conventional aqueous based etchants, this method leads to milder reactions with less heat generation and avoids the safety hazards associated with bubbling/spilling occurred in the conventional etching methods. It also increased etching yield of porous Si (PSi) by preventing over-etching of Si. In addition, the etching agent used in this etchant system is easy to be separated and recycles/reused so the total cost of etching process is largely reduced.

Various configurations permutations on this basic design are envisioned. Ideally, the organic solvents are not miscible with water while the etching agents in the medium can dissolve into the solvents. Examples of such organic solvents include but are not limited to: aromatic compounds such as benzene, toluene, xylene, cumene, etc. and aliphatic compounds such as hexane, cyclohexane, pentane, decene, etc and a mixture of such solvents.

Example etching agents include but are not limited to hydrofluoric acid (HF), ammonium fluoride ($NH_4F$), Nitric acid ($HNO_3$) $NH_4F$, KF, NaF, $KHF_2$, or $NaHF_2$ all used in rations similar to the ratios described above. combinations thereof and the like. In some cases, the Si-containing material may be pretreated by any of a variety of ways including heating in an inert atmosphere, and granule sizes maybe controlled In one arrangement, organic solvents that are not miscible with water and cannot oxidize Si, and etchants that can be mixed with both organic solvents and water were combined into an etching solution. This is a dual phase solution where the organic solvent forms a second layer suspension (or droplet suspension during stirring) within etchant/water solution. Because etchant is also mixable with the etchant, part of etchant in the original etchant/water solution will be absorbed/mixed within the droplet suspension of organic solvent to form etchant/organic solvent solution.

The etchant/organic mixture has a much better wettability with the Si containing material than those of the etchant/water mixture. Therefore, when Si containing material is added to the suspension of etchant/organic droplet in etchant/water solution, etchant/organic droplet will be preferentially absorbed on the surface of Si containing material. As a result, etchant within etchant/organic droplet will be consumed to etch SiOx. More importantly, newly exposed Si surface after etching of SiOx will not be exposed to water which can quickly oxidize Si. The etchant within etchant/water solution will serve as an etchant reservoir. After etchant in the etchant/organic droplet is depleted, etchant in etchant/water solution will be continue dissolved in etchant/organic droplet. This process will continue until all of SiOx has been etched. Even at the end of the etching process, Si surface will be protected by organic solvent.

During this process, the etching is limited to original SiOx in the Si/SiOx matrix precursors. As a result, a mild etching reaction rate can be achieved without over-etching of Si, leading to a higher Si yield and a process with lower heat generation rate that is easy to handle. After etching, etched porous Si and organic solvent will form a separate suspension layer on the top of depleted etchant/water solution which can be easily filtered and reused/recycled. This method can be used to produce PSi for different applications. In particular, the produced PSi can be used as a precursor to make Si-based anode materials for lithium-ion batteries (LIBs) to replace conventional graphite anodes, Si nano particles, and the Si-based material SiO, which are commercially available.

The utilization of the described method to enable use of PSi as a precursor for Si-based anodes present a number of advantages including; lower costs due to higher PSi yield and easy recovery of the residual etching agent, better PSi structure control without over-etching of Si, safer and etching process due to a mild heat generation rate. This methodology can be utilized in a variety of specific examples including the following:

Example 1

PSi is prepared by heat treatment of SiO at 850° C. in Ar atmosphere to generate Si/SiOx matrix, then followed by etching in 48 wt % HF aqueous solution for 1 hour to remove SiOx.

Example 2

PSi is prepared by heat treatment of SiO at 850° C. in Ar atmosphere to generate Si/SiOx matrix, then followed by etching in 48 wt % HF aqueous solution for 10 minutes to remove SiOx.

Example 3

PSi is prepared by heat treatment of SiO at 850° C. in Ar atmosphere to generate Si/SiOx matrix, then followed by etching in 48 wt % HF aqueous solution for 2 hours to remove SiOx.

Example 4

PSi is prepared by heat treatment of SiO at 850° C. in Ar atmosphere to generate Si/SiOx matrix, then followed by etching in a mixture of benzene/48 wt % HF aqueous solution (2:1 vol/vol) for one hour to remove SiOx.

Example 5

PSi is prepared by heat treatment of SiO at 850° C. in Ar atmosphere to generate Si/SiOx matrix, then followed by etching in a mixture of benzene/48 wt % HF aqueous solution (2:1 vol/vol) for 10 minutes to remove SiOx.

Example 6

PSi is prepared by heat treatment of SiO at 850° C. in Ar atmosphere to generate Si/SiOx matrix, then followed by etching in a mixture of benzene/HF 48 wt % aqueous solution (2:1 vol/vol) for 2 hours to remove SiOx.

Example 7

PSi is prepared by heat treatment of SiO at 850° C. in Ar atmosphere to generate Si/SiOx matrix, then followed by etching in a mixture of hexane/48 wt % HF aqueous solution (2:1 vol/vol) for 1 hour to remove SiOx.

Example 8

Precursors for $SiO_{1.5}$ is prepared by hydrolysis of 50 ml triethoxysilane in 200 ml 0.1 M hydrochloric acid solution under stirring at room temperature. The white precipitate silsesquioxane is collected by filtration and then dried at 80° C. under vacuum. The silsesquioxane powder is calcined in Ar at 1000° C. to generate Si/SiOx matrix. Then the powder is etched in a mixture of xylene and 48 wt % HF solution (2:1 vol/vol) for 1 hour to obtain porous Si powder.

TABLE 1

Comparison of yield and heat generation rate of different examples

| Examples | Yield (weight) | Heat generation rate |
|---|---|---|
| 1 | 20% | High |
| 2 | 22% | High |
| 3 | 18% | High |
| 4 | 28% | Low |
| 5 | 200%* | Low |
| 6 | 28% | Low |
| 7 | 320%* | Low |
| 8 | 12% | Low |

*Etching is not completed during the specific time used in this experiment.

The theoretical yield from Si/SiOx precursor to Si is 31.8 wt % (2SiO→Si+SiO$_2$) for example 1-7 and 13.5 wt % (4SiO$_{1.5}$→Si+3SiO$_2$) for example 8 assuming disproportionation reaction is complete during heat treatment and there is no material loss during sample collection after etching. As shown in Table 1, using aqueous etching system alone (example 1-3) leads to a yield much lower than the theoretical, indicating significant over-etching. Over-etching is also evidenced by decreased yield with longer etching duration. The etching process also generates a noticeable amount of heat which may lead to safety hazard due to bubbling/spilling of etching agent which requires the use of external cooling to avoid overheating/spilling of the etching solution.

In comparison, a yield close to the theoretical value is obtained by using the new etchant system (example 4, 6 and 8). In addition, the yield does not change with different etching duration, which suggests that the etchant system does not attack Si. The heat generation is also mild. Example 5 shows that the etching is not complete after 10 mins. In contrast, Si is over-etched in just 10 mins using the conventional etchant agent as shown in example 2. This is clear evidence that the etching process in Example 5 with the new etching system is much slower than those in Example 2 with the conventional etching system. Example 7 uses aliphatic compound hexane. The yield is higher than the theoretical value, suggesting the etching is not complete. This is because of lower solubility of HF in hexane than in benzene. Further etching can be obtained by elongating the etching duration.

As shown in FIG. 1, prior art methods typically limit the fluorine compound (such as HF) in their etchant to relatively low weight percentages and do not use or no sufficient (<5%) organic solvent so as to control the etching process. In one embodiment for examples such as those shown in FIG. 2, our etchant contained a water solution of HF (HF weight in this water solution is 48%). In another example we used a mixture of benzene/48 wt % HF aqueous solution (2:1 vol/vol). In another embodiment the etchant included 60.5 wt % of benzene, 19 wt % of pure HF, and 20.5 wt % water. In yet another arrangement the organic solvent to etching agent weight ratio is no more than 18:1 preferentially no more than 10:1, further preferentially no more than 5:1. In addition to HF other etching agents include but are not limited to acids such as NH$_4$F, KF, NaF, KHF$_2$, or NaHF$_2$ all used in rations similar to the ratios described above.

While various preferred embodiments of the disclosure are shown and described, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

What is claimed is:

1. A method for etching materials, the method comprising the steps of:
    forming a mixture that contains, a silicon containing powder material having a surface that is to be etched and a core portion that is not to be etched and an etchant solution comprising an etchant, water and an organic solvent that can dissolve the etchant but is not miscible with water; the mixture having a ratio of 1 part in weight of Si-containing powder, 5-40 parts in weight of organic solvent, and 5-20 parts in weight of acidic aqueous etchant, and
    alternatively stirring the mixture to etch the material whereby the organic solvent with acidic etchant dissolved therein preferentially contacts and etches the surface of material, while the organic solvent preferentially contacts and covers the newly etched area which prevents additional interaction of this newly etched surface with water, and when not stirring the mixture, the etching stops and a phase separation of materials takes place with material covered by organic solvent forming a separate layer.

2. The method of claim 1 wherein the organic solvent comprises an aromatic compound.

3. The method of claim 2 wherein the organic solvent further comprises an aliphatic compound.

4. The method of claim 3 wherein the aromatic compound is selected from the group consisting of such as benzene, toluene, xylene, cumene, and mixtures thereof and the aliphatic is selected from the group consisting of hexane, cyclohexane, pentane, decene, and mixtures thereof.

5. The method of claim 1 wherein the etching agent is selected from the group consisting of hydrofluoric acid (HF), ammonium fluoride (NH$_4$F), nitric acid (HNO$_3$) and combinations thereof.

6. The method of claim 1 further comprising the step of recovering the acidic etching agent.

7. The method of claim 1 wherein the stirring takes place for less than 3 hours.

8. The method of claim 1 further comprising the step of pre-treating the Si-powder by heating in an inert atmosphere.

9. The method of claim 1 wherein the Si powder has a granule size of less than 100 μm.

10. A process for making a porous silicon, the process comprising the steps of:
    alternatively stirring and not stirring a mixture that contains an organic solvent, an acidic aqueous etchant and a Si-containing powder in a ratio of 1 part Si-powder, 5-20 parts organic solvent, and 5-40 parts acidic aqueous etchant;
    whereby etching of the Si-containing powder occurs when the mixture is stirred causing the Si-containing powder and the aqueous acid etchant to be brought into contact while the organic solvent intervenes to form an organic phase that protects newly exposed Si from further reaction with the acidic aqueous etchant thus preventing additional etching and heat generation, when the stirring of the mixture stops the Si containing powder separates into the organic phase away from the acidic aqueous etchant and the etching stops resulting in a powder having a porous silicon structure.

11. The process of claim 10 wherein the resulting porous silicon has a porosity of 10-90%.

12. The method of claim 10 wherein the organic solvent comprises an aromatic compound.

13. The method of claim 11 wherein the organic solvent further comprises an aliphatic compound.

14. The method of claim 12 wherein the aromatic compound is selected from the group consisting of such as benzene, toluene, xylene, cumene, and mixtures thereof and the aliphatic is selected from the group consisting of hexane, cyclohexane, pentane, decene, and mixtures thereof.

15. The method of claim 10 wherein the etching agent is selected from the group consisting of hydrofluoric acid (HF), ammonium fluoride ($NH_4F$), Nitric acid ($HNO_3$) and combinations thereof.

16. The method of claim 10 wherein the stirring takes place for less than 3 hours.

17. The method of claim 10 further comprising the step of pre-treating the Si-powder by heating in an inert atmosphere.

* * * * *